ically controlled with the control point adjustable
United States Patent

Van Damme et al.

[11] 3,994,034
[45] Nov. 30, 1976

[54] BEEHIVE HEATER

[76] Inventors: Joseph Van Damme, 19 Livingston Road; C. Charles Rendino, 56 Lantern Lane, both of Sharon, Mass. 02067

[22] Filed: Oct. 1, 1975

[21] Appl. No.: 618,580

[52] U.S. Cl. .............................. 6/1; 6/7
[51] Int. Cl.² ........................... A01K 47/00
[58] Field of Search .............. 6/1, 12 M, 7

[56] References Cited
UNITED STATES PATENTS

| | | | |
|---|---|---|---|
| 2,232,343 | 2/1941 | Sauter | 6/1 |
| 2,506,118 | 5/1950 | Taylor | 6/1 |
| 2,584,305 | 2/1952 | Taylor | 6/1 |
| 2,600,194 | 6/1952 | Bennett | 6/1 |

*Primary Examiner*—Louis G. Mancene
*Assistant Examiner*—Jack Q. Lever
*Attorney, Agent, or Firm*—Frank J. Fleming

[57] ABSTRACT

A beehive heater for installation between the lower brood chamber and the bottom board of a standard beehive for protecting a colony during the winter with a minimum of winter brood production and for accelerating spring brood production. The beehive heater provides an insulating curtain of heated air adjacent to the walls of the brood chambers. Air enters a plenum chamber where it is heated by a low temperature heating element and flows out of the plenum chamber through a series of holes located adjacent to the periphery of the lower brood chamber to form the insulating curtain of heated air adjacent to the walls. A landing board and entrance is provided near the upper edge of the beehive heater as means for the bees to enter and leave the lower brood chamber. The temperature of the air in the plenum chamber is thermostatically controlled with the control point adjustable so that it may be set for winter or spring operation.

11 Claims, 3 Drawing Figures

BEEHIVE HEATER

FIELD OF THE INVENTION

This invention relates to an improved beehive heater. More particularly, this invention relates to a beehive heater which prevents freezing air from entering the hive and regulates the temperature of the air surrounding the cluster.

DESCRIPTION OF THE PRIOR ART

The book "ABC and XYZ of Bee Culture" published in 1954 by The A. I. Root Company describes the many problems and practices involved in wintering bees. Referring particularly to the second column on page 697, it suggests maintaining the air surrounding the bees at a constant temperature. As will be obvious from careful reading, the author is suggesting maintaining the temperatuare of the air in the throughout the hive constant. The author does not suggest the use of an insulating curtain of heated air which does not come directly in contact with the bees, but instead acts to reduce the loss of heat from the cluster when the temperature outside of the hive drops substantially below the safe temperature for the bees to survive.

Taylor U.S. Pat. Nos. 2,506,118 and 2,584,305 disclose a beehive heater and a ventilator respectively. The beehive heater applies heat evenly throughout the brood chambers. The air in the brood chambers is heated by contact with a heated floor. As a consequence, the heated air rising through the brood chambers is evenly heated and the floor is hotter than the air. The rising heated air flows directly through the cluster region between the combs, resulting in the possibility of overheating and drying out the bees. The affect of this arrangement for supplying heat will be discussed later herein.

SUMMARY OF THE INVENTION

In an unheated beehive, during the winter bees form a cluster between the combs when the honey is stored. As the temperature in the hive drops, the cluster becomes more compact. Bees can stand a temperature of about 40° F for a fairly long time providing they have access to the honey stored in the combs. When their temperature falls too far below 40° F, the bees become immobile, usually falling to the floor to die to starvation unless the temperature rises soon enough to restore mobility. When the surface of the cluster is raised periodically to 40° F, the bees can move to the stored honey and fewer bees die of starvation. Therefore, there is an advantage in preventing the surface of the cluster from remaining below 40° F for long periods of time and in warming the bees that fall to the floor to that temperature.

A normal winter cluster will produce some new brood, depending on the temperature around the cluster. When the surface of the cluster is maintained at too high a temperature in the wintertime, brood production is stimulated when it is not needed, with a corresponding increase in honey consumption. Therefore, there is an advantage in maintaining the outer surface of the cluster at a temperature above ambient up to approximately 40° F when the temperature outside of the hive is below 40° F so as to maintain the bees sufficiently mobile to feed to stay alive, but not at a temperature high enough to increase brood production.

A further advantage of limiting the temperature of th surface of the cluster.to about 40° F during the winter while the bees are hive bound and relatively immobile is that the discharge of excess moisture by the bees is avoided. If a heater causes bees to dry out, they will die. Moisture, per se, discharged into the hive in reasonable amounts is not a problem since it condenses on cold surfaces and the bees reuse it as a source of fluid. However, freeing of the moisture and the drips from the ice are harmful.

As the temperature outside of the hive increases in the late winter and early spring, the colony increases its numbers rapidly by more intensive brood production. If a cold spell occurs after the cluster has expanded and produced brood in its outer bounds, the cluster contracts during the cold period and some of the brood are chilled and die. Therefore, by maintaining the surface of the cluster at a temperature above freezing, up to 90° F during such cold spells, the casualties from chilled brood are reduced. Furthermore, by maintaining this higher temperature continuously during the cool spring weather, the spring build up of bees is accelerated to provide a strong, early work force to harvest the spring nectar and pollen which would otherwise have been lost.

In a wintering hive, the bees attempt to close off the flow of cold air by reducing the size of the air vents and inlets. When the outside temperature warms up, the inside temperature will remain cold. The difference between the inside and outside temperature is greater when the hive is insulated. As a result, the bees often remain in the hive and do not emerge for cleansing flights.

It is an object of this invention to provide a novel beehive heater which automatically maintains the surface of the cluster at an optimum temperature for protecting a colony during the winter and for accelerating and protecting the brood in the spring.

It is a further object of this invention to provide a novel beehive heater which can be manually set to initiate and successfully maintain accelerated brood production earlier than under natural conditions.

It is still a further object of this invention to provide a novel beehive heater which will prevent the surface of the cluster from suffering excessively cold temperatures for extended periods of time.

It is still another object of this invention to provide a beehive heater that continuously provides a small adjustable amount of tempered air for ventilation of the hive.

It is still another object of this invention to provide a beehive heater than enables the temperature outside the cluster in the wintering hive to track the outdoor temperature when it goes above 40° F even though the hive may be insulated.

It is still a further object of this invention to provide a beehive heater that is a simple accessory easily installed by a beekeeper without the use of tools.

The objects of this invention are achieved by supplying a heated curtain of air adjacent to the walls of the brood chambers. Air flows into a plenum chamber in the beehive heater where it is heated to the desired temperature. The heated air flows upwardly out of the plenum chamber through a series of spaced holes in the periphery of the top panel to provide the curtain of heated air. By providing a curtain of heated air, the surface of the cluster is protected from penetration of the outside temperature, substantially maintaining the surface of the cluster at a predetermined temperature. The temperature of the air curtain may be controlled for either wintering or for accelerated brood production.

DESCRIPTION OF THE DRAWINGS

An understanding of the general nature of this invention and an appreciation of its many advantages will best be gained from a study of the following description given in connection with the drawings in which.

DESCRIPTION OF PREFERRED EMBODIMENTS

Figure 1:
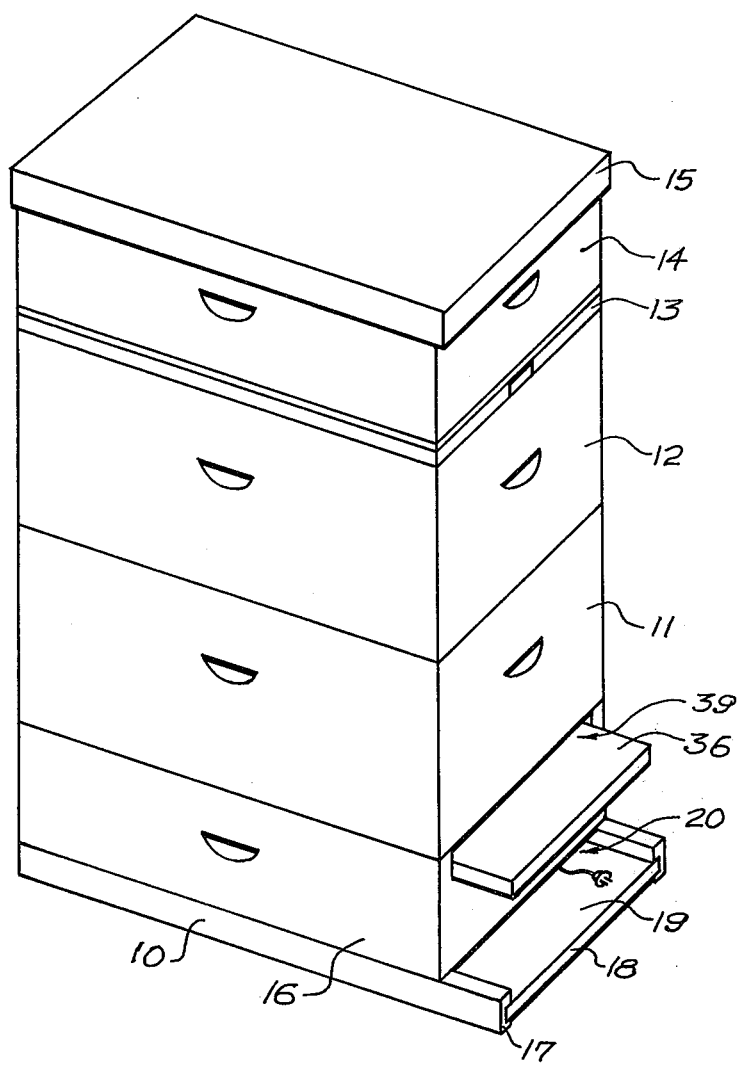
FIG. 1 is a perspective view of the beehive heater installed between a lower brood chamber and bottom board of a beehive.

Referring to FIG. 1, the standard parts of a hive assembly for beekeeping includes bottom board 10 on which the lower brood chamber 11 normally rests. The assembly includes an upper brood chamber 12, an inner cover 13 and outer cover 15. This invention resides in the beehive heater 16 which is inserted between bottom board 10 and lower brood chamber 11. The standard parts of the beehive will now be described with reference to both FIGS. 1 and 2. Bottom board 10 has a frame 17 in which is mounted panel 18. Panel 18 projects beyond the front of lower brood chamber 11 to provide landing board 19 and entrance 20. A cleat 21 (not shown in FIG. 1) having a slot 22 is inserted in entrance 20 during the winter period to reduce the flow of air into the hive. Lower brood chamber 11 has a recess 23 at the front and back walls 24 and 25, in which are hung comb frames 26 with combs 27 mounted therein depending downwardly. The comb frames 26 are spaced apart to provide space for the bees between each pair. Amoung other uses, the space provides the bees with access to the honey stored in the combs 27 for food. In like manner, upper brood chamber 12 has recesses 23a at the top front and back walls 24a and 25a in which are hung comb frambes 26a with the combs 27a mounted therein depending downwardly. The comb frames 26a are spaced apart in line with the comb frames 26 so that the space between each pair of combs 27 and 27a is a continuous space in which the winter cluster 28 may be formed.

When the beehive heater is in operation, it is recommended that inner cover 13 be turned over so it is in the attitude shown in the figures with the opening 29 in panel 30 thereof blocked by some means such as with insulation 31 in a shallow super 14. With the inner cover 13 turned over in this manner, vent passage 32 provides an upper bee entrance and a restricted vent for the beehive during the periods when it is advantageous to operate the beehive heater. The insulation installed by the beekeeper prevents freezing of condensate which forms at the top of the hive. In the assembly thus far described, air enters the hive through entrance 20 and slot 22 in cleat 21 (shown only in FIG. 2) and flows upwardly through the spaces between the combs 27 and 27a and out through vent passage 32.

Figure 2:
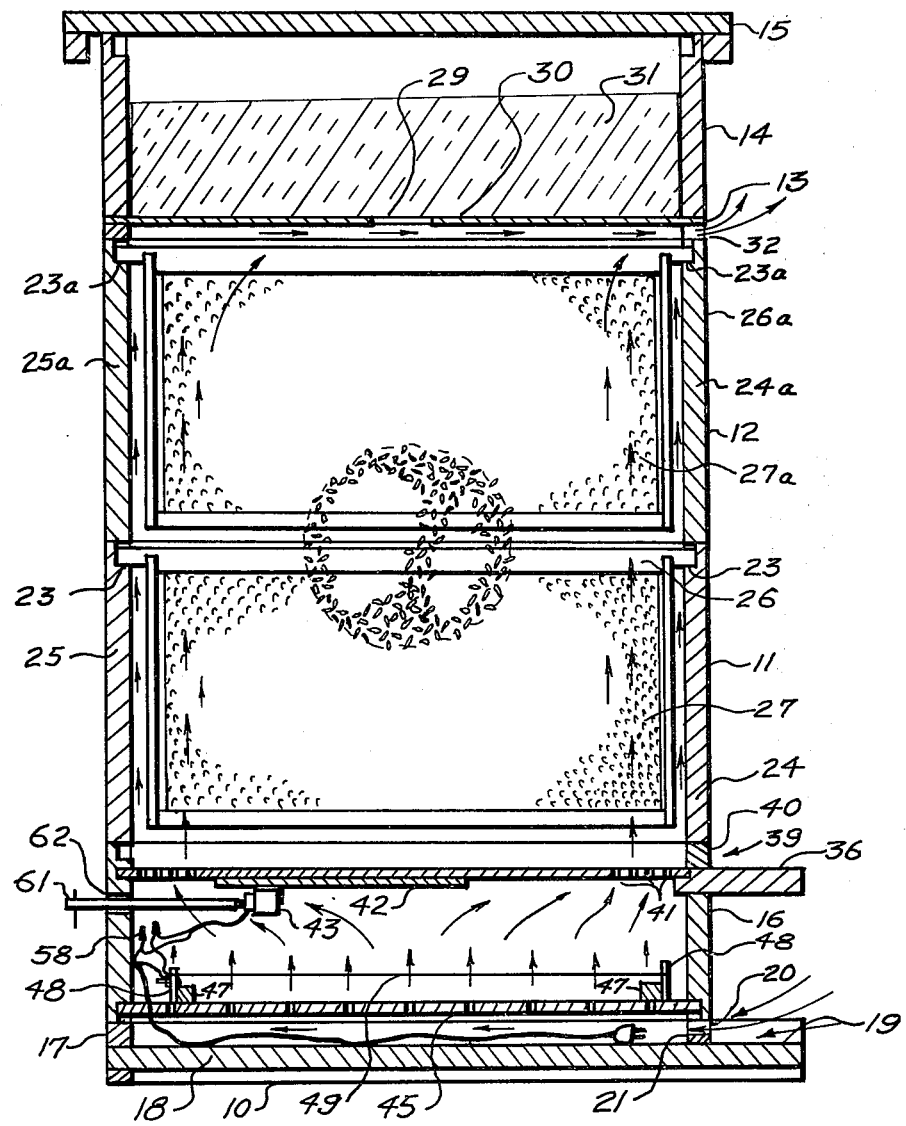
FIG. 2 is a cross-sectional view of the assembly of FIG. 1 taken from one side thereof.
Figure 3:
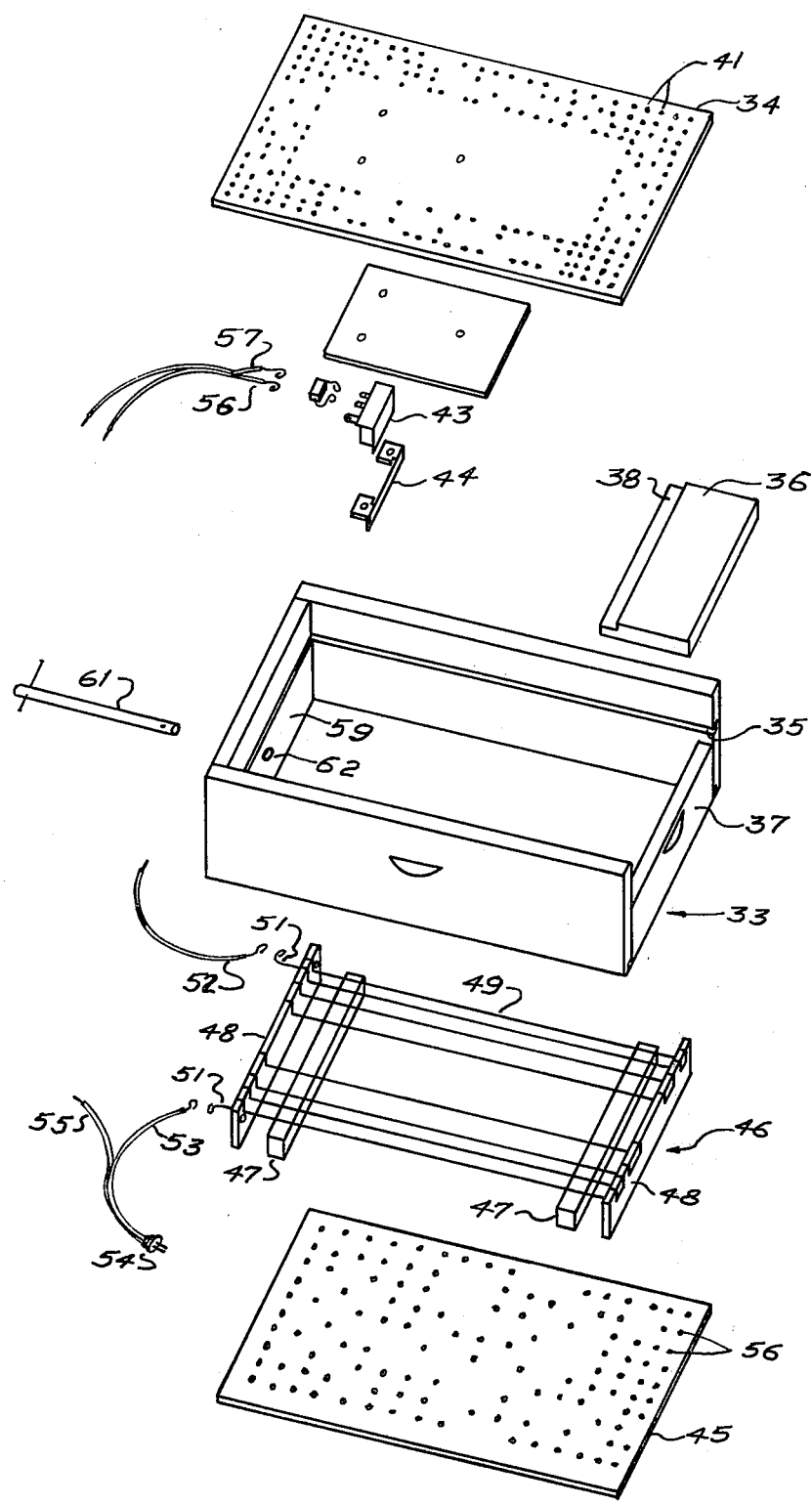
FIG. 3 is an exploded view of the beehive heater.

As stated above, this invention resides in the beehive heater 16 which is shown in FIGS. 1 and 2 installed between bottom board 10 and lower brood chamber 11 and in more detail in FIG. 3. The beehive heater 16 has a body 33 which may be economically made by modifying a standard shallow super which is adapted to be inserted in the standard beehive described hereinabove. A top panel 34 is inserted in groove 35 located in the walls of body 33 a distance from the top edge thereof. Landing board 36 is attached to the front wall 37 of body 33 by screws (not shown) with the front edge of top panel 34 resting in recess 38 so that the top surface of landing board 36 and top panel 33 are flush with each other. The space over the top surface of landing board 36 provides entrance 39. Entrance 39 is made the same size as entrance 20 in bottom board 10. With the beehive heater 16 installed in the assembly, the bees land on landing board 36 and proceed through entrance 39 onto top panel 34 with top panel 34 now acting as the floor of the hive. As shown in FIG. 2, a cleat 40 is installed in entrance 39 to close the entrance during the winter. Top panel 34 has a series of holes 41 adjacent to its outer edges. A heat reservoir 42 is attached to the underside of the central portion of top panel 34 where it does not cover holes 41 and thermostatic switch 43 is attached in contact with the underside of heat reservoir 42 by bolts (not shown) and bracket 44.

Bottom panel 45 is mounted near the lower edge of body 33 and has mounted on its upper surface heating element 46. Heating element 46 includes a pair of cleats 47 mounted on bottom panel 45 near each end thereof by screws (not shown). A pair of notched electrical and heat insulating racks 48 are mounted on cleats 47 by screws (not shown) with notchededges extending upward. A resistance wire 49 is mounted on notched racks 48 to form a continuous heating filament. Heating element 46 is preferably designed to operate at a relatively low temperature having a minimum of radiant energy. The ends 51 of the wire 49 are suitably attached to notched racks 48 and are connected to lead wires 52 and 53. An electrical plug 54 is attached to lead wire 53 and to lead wire 55. Bottom panel 45 has a series of holes 56 spaced substantially uniformly throughout its surface. The electrical wiring is completed by connecting lead wires 56 and 57 to thermostatic switch 43 and to lead wires 55 and 52 respectively, using twist-on connectors 58. Lead wires 55 and 52 are conveniently held in place on the back wall of body 33 by insulated staples (not shown).

The size of holes 41 in the top panel and holes 56 in the bottom panel is selected to admit air, but keep bees and rodents from entering plenum chamber 60, which is formed by body 33, top panel 34 and bottom panel 45. Thermostatic switch 43 is equipped with a key 61 with which to manually change the temperature setting. The key 61 may be inserted through hole 62 in the wall of body 33 to engage with the thermostatic switch. Thermostatic switch is preferably equipped with stop members (not shown) so that it can be manually turned to two different preselected temperature settings.

In operation, the thermostatic switch 43 is set for a temperature of about 40° F for operation during the winter months and manually changed to a temperature setting of about 90 degrees at the time the beekeeper deems it to be advantageous to accelerate brood production. At whichever temperature thermostatic switch 43 is set, it will maintain the air in the plenum chamber 60 at that temperature. Air enters plenum chamber 60 through entrance 20 in bottom board 10 and holes 56 in bottom panel 45, where it is heated by resistance wire 49. Heat reservoir 42 absorbs heat from the air and aids in maintaining the temperature in plenum chamber 60 substantially constant.

Heated air flows upwardly out of plenum chamber 60 through holes 41 in top panel 34 to form an insulating curtain of heated air along the walls of brood chambers 11 and 12 and thence flows out through vent passage 32. Arrows in FIG. 2 show the air flow pattern. No air flows out of the plenum chamber 60 directly against cluster 28 when it is in its normal position. Heated air flowing along the walls advantageously maintains the outside of the cluster at a desired temperature and prevents the loss of heat from the cluster. Thus the bees remain sufficiently mobile to feed on the honey stored in combs 27 and 27a. By using a heating wire 49 which operates at a relatively low temperature, substantially no direct radiation reaches the bees through the holes 41 which might result in over heating them.

During operation, air flow through entrance 39 in body 33 is stopped by inserting cleat 40. Air flow through entrance 20 in bottom board 10 may be maintained at a desirable minimum by using the desired size slot in cleat 21.

As can be appreciated from the above description, the insulating curtain of heated air adjacent to the walls can be changed by manually setting thermostatic switch 43 to a new setting. Therefore, the beekeeper can promote brood production when he deems it to be the proper time. With either setting, the heated air is never directed to the surface of the cluster where it might overheat the bees and cause unwanted increase in brood production or an undesirable drying of the bees. The bees are further protected from any direct deleterious radiation by using the low temperature heating wire. Removable key 61 provides a tamper proof means for manually adjusting the temperature at which the beehive operates. The beehive heater is adapted to fit between standard existing parts of a beehive so it may be installed without need for tools.

We claim:

1. A beehive heater for installation under the brood chambers of a beehive, comprising, in combination:
 a body having a plenum chamber therein,
 said plenum chamber having air inlet means and air curtain forming outlet means;
 heating means mounted is said plenum chamber;
 temperature control means associated with said heating means for controlling the temperature in said plenum chamber at a preselected value;
 whereby air flowing into said plenum chamber through said air inlet means is heated to said preselected temperature by said heating means and the heated air flows upwardly out of said plenum chamber through said air curtain forming outlet means to provide an insulating curtain of heated air adjacent to the walls of said brood chambers.

2. A beehive heater as claimed in claim 1, wherein said air curtain forming outlet means comprises:
 passages through the top wall of said plenum chamber arranged adjacent to the periphery thereof.

3. A beehive heater as claimed in claim 1 wherein said air inlet means comprises:
 passages through the bottom wall of said plenum chamber arranged to distribute inflowing air evenly throughout said plenum chamber.

4. A beehive heater as claimed in claim 1 wherein said combination further comprises:
 heating reservoir means mounted in said plenum chamber with said temperature control means mounted in contact therewith.

5. A beehive heater as claimed in claim 1 wherein said heating means is an electrical resistance element.

6. A beehive heater as claimed in claim 1 wherein said temperature control means is a thermostat.

7. A beehive heater as claimed in claim 6 wherein said thermostat has two preselected temperature settings with manual means for changing from one preselected temperature setting to the other preselected temperature setting.

8. A beehive heater as claimed in claim 7 wherein said manual means is operable with a removal key from outside the plenum chamber,
 whereby said thermostat is inaccessable without said key and is therefore tamperproof.

9. A beehive heater as claimed in claim 1 wherein said heating means is designed to operate at a relatively low temperature,
 whereby substantially no radiant energy therefrom will be received outside of said plenum chamber.

10. A beehive heater as claimed in claim 1 wherein said combination further comprises:
 bee entrance and
 landing board mounted to extend outwardly from said body,
 said bee entrance and landing board being arranged to provide means for bees to enter and leave said brood chambers.

11. A beehive heater as claimed in claim 2 wherein said air inlet means comprises passages through the bottom wall of said plenum chamber arranged to distribute inflowing air evenly throughout said plenum chamber,
 said heating means in an electrical resistance element,
 said temperature control means is a thermostat, and wherein
 said thermostat has two preselected temperature settings with manual means for changing from one preselected temperature setting to the other preselected temperature setting,
 and wherein said combination further comprises:
 heat reservoir means mounted in said plenum chamber with said thermostat mounted in contact therewith;
 bee entrance; and
 landing board,
 said bee entrance and landing board being arranged to provide means for bees to enter and leave said brood chambers.

* * * * *